United States Patent Office 3,484,249
Patented Dec. 16, 1969

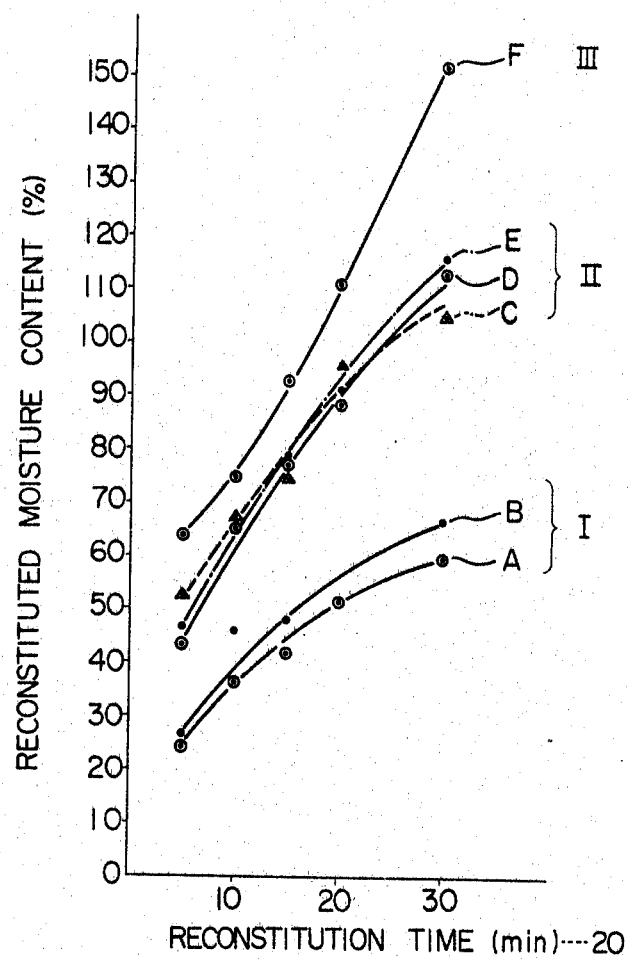

3,484,249
METHOD OF PREPARING PRECOOKED DRY RICE
Minako Tanaka and Susumu Yukami, Tokyo, Japan, assignors to The Lion Dentifrice Co., Ltd., Tokyo, Japan
Filed Oct. 21, 1966, Ser. No. 588,487
Claims priority, application Japan, May 25, 1966, 41/32,940
Int. Cl. A23l *1/10*
U.S. Cl. 99—80       5 Claims

ABSTRACT OF THE DISCLOSURE

Method of preparing precooked dried rice which essentially involves the steps of (1) soaking milled rice in an aqueous solution of a phosphate; (2) cooking the thus-completed soaked rice in a dilute aqueous solution of a phosphate in the copresence of a saccharide and a surfactant until a degree of gelatinization of between about 65–75% and a moisture content of about 50–70% by weight are attained; (3) steaming the thus-cooked rice at a temperature of between about 100–120° C. until a degree of gelatinization of 100% and a moisture content of 50–70% are attained, and thereafter (4) drying the rice rapidly until its moisture content is reduced to less than 10% by weight.

---

This invention relates to instant foods, and in particular to precooked dry rice and a method of preparing the same. Specifically, the invention relates to a substantially completely gelatinized precooked dry rice which possessing prompt reconstitutive characteristics, that is, can be reconstituted in a short period of only about 5–8 minutes, and which, upon reconstitution, presents a highly pleasing appearance and is very palatable.

More particularly, this invention relates to a precooked dry rice having a degree of gelatinization of 100% (hereinafter to be referred to as just "gelatinized dry rice"), which excels in palatableness as well as appearance and whose reconstitutive characteristics are so remarkable that its moisture content upon reconstitution at a reconstitution temperature of 20° C. and a period of 10 minutes is at least 70% by weight (on the basis of air dried weight; this basis to be applied similarly hereinafter), at 20 minutes is at least 100% by weight and at 30 minutes is at least 130% by weight. This invention also relates to a method of preparing the foregoing gelatinized dry rice, which comprises:

(a) soaking milled rice in an aqueous solution of at least one phosphate or polyphosphate at a pH between 7.3–8.5 and preferably between pH 7.6–8.2;
(a′) after soaking, preferably isolating said rice once from said aqueous solution;
(b) cooking the soaking-treatment-completed rice in a dilute aqueous solution of at least one phosphate or polyphosphate preferably at a concentration of 0.05–0.5%, in the presence of a saccharide and a surfactant by adding said saccharide and said surfactant in amounts in the order of respectively 0.3–10% and 0.1–0.5%, based on the absolute dry weight of the treatment-completed rice, the cooking being carried to a degree of gelatinization of 65–75%, usually ca. 70%, and a moisture content of 50–70% (based on the absolute dry weight of the material rice);
(c) steaming the so cooking-treatment-completed rice at a temperature 100–120° C. until a degree of gelatinization of 100% and a moisture content of 50–70% (based on the absolute dry weight of the material rice) and preferably 55–70% by weight, are attained; and
(d) thereafter drying the rice rapidly until its moisture content is reduced to not more than 10% by weight based on the absolute dry weight of the material rice).

Numerous proposals have been made concerning the preparation of gelatinized dry rice by reconstitution which involves the simple expedient of adding boiling water thereto. These proposals consisted of subjecting rice to various treatments followed by cooking and gelatinization and thereafter drying. However, because of the insufficiency of the gelatinization step, the product, when reconstituted, loses the desirable palatableness characteristic of cooked rice. In addition, not only does the appearance become extremely unsatisfactory and agglomeration takes place, but also the time required for its reconstitution is unsatisfactory. Particularly, when the gelatinization was carried out to a greater degree it has been found that the palatability of the rice was impaired exceedingly in that the rice served for food purposes was either too soft or too tough, or the individual identity of the grains was lost as a result of the formation of a pasty mass, or otherwise agglomeration would take place hence these methods were not practical from the standpoint of producing a palatable product. Therefore, it has been a long-cherished desire in the art to provide a gelatinized dry rice which, when reconstituted would possess, a pleasing appearance comparable to well-cooked rice, excellent palatability, and which could be promptly reconstituted to a thoroughly gelatinized rice.

As a result of our researches aiming to achieve the foregoing desire, we have found that the collective possession of these reconstitutive characteristics was very unexpectedly influenced under the conditions of the inseparable combination of the soaking step, where the additives are added to the soaked rice, and the cooking step by the conditions of the two-stage gelatinization process where the two factors consisting of the moisture content and the degree of gelatinization prior to the quick drying step are conditioned. In the various prior proposals, there was no recognition at all of the influence that the foregoing two factors had on the reconstitutive characteristics, nor has the prior art made any mention of the combination of the above steps. For example, attempts were made to prevent the tendency of agglomeration during reconstitution by adding oils or fats, or the addition of such as acids, alkalis, pastes, saccharides, starch, proteases and starch decomposing enzymes, etc., to a suitable step without any definite basis. Hence, it has not been possible to obtain a product which conjointly possessed the various desirable requisites that were demanded in a gelatinized dry rice.

It is therefore an object of this invention to provide a precooked dry rice which, when reconstituted, is exceedingly palatable, has a good appearance, excels in its reconstitutive characteristics, has especially good speed of reconstitution, and moreover is substantially completely gelatinized.

Another object is to provide a method of preparing a dry rice having collectively the excellent reconstitutive characteristics which had heretofore been unobtainable.

Other objects and advantages of the invention will be apparent from the following description.

According to this invention, a gelatinized dry rice is provided which, when reconstituted, is highly palatable, has an excellent non-agglomerated appearance, whose degree of gelatinization is substantially 100% and in which the moisture content, upon reconstitution in water at 20° C., is at least 70% by weight when the reconstitution time is 10 minutes, is at least 100% by weight when the time is 20 minutes and at least 130% by weight when the time is 30 minutes.

The content of reconstituted moisture in this case is determined in the following manner:

*Reconstituted moisture content.*—W grams of a specimen of the air-dried product (moisture content is 6.5±1.5% based on the absolute dry weight) is weighed carefully, following which it is soaked for Y minutes in X° C. water. After removing the excess water that adheres with a filter paper, it is weighed (W' g.). The reconstituted moisture content is calculated, using the following equation:

$$\text{Reconstituted moisture content (percent)} = \frac{W' - W}{W} \times 100$$

This is the reconstituted moisture content of the product at a reconstitution temperature of X° C. and a reconstitution time of Y minutes.

According to this invented method, first the washed milled rice is soaked in an aqueous solution of at least one phosphate or polyphosphate in the soaking step (a). solution was adjusted between pH 7.3–8.5, and particularly between pH 7.6–8.2. The soaking time will vary depending upon the soaking temperature, the variety of the material rice, its storage period, etc., but normally a soaking time of about 3 hours is adopted when the temperature of the soaking solution is 20° C. and about one hour when the temperature of the solution is 30° C.

As the phosphates contemplated herein the sodium, potassium, ammonium and lithium orthophosphates; the sodium, potassium, ammonium and lithium pyrophosphates; acidic pyrophosphates of sodium, potassium, ammonium and lithium are included. As the polyphosphates, the similar salts of tripolyphosphoric, tetrapolyphosphoric, pentapolyphosphoric, hexapolyphosphoric, metaphosphoric and hexametaphosphoric acids are included.

After the soaking treatment step (a), the rice is preferably isolated from the soaking aqueous solution in consideration of the operational advantage of maintaining the concentration of the foregoing salts in the aqueous solution of the phosphate and/or polyphosphate constant during the subsequent cooking step and also for avoiding the unfavorable effects in those cases where the time that elapses between the soaking step and the cooking step becomes unduly prolonged.

The soaking-treatment-completed rice is then transferred to the cooking step carried out in the presence of the saccharide and surfactant. The saccharides may be one of lactose, sucrose, sorbitol, mannitol and partially hydrolyzed starch; and the added surfactants may be glycerol fatty acid esters, sucrose esters, sorbitan fatty acid esters and fatty acid propylene glycol esters. The saccharide is preferably added in an amount ranging between 0.3% and 10%, based on the absolute dry weight of the rice, while the addition of the surfactant is preferably within the range between 0.1% and 5%. The pH of the soaking solution and the amounts of added saccharide and surfactant, as hereinabove specified, are conditions which are especially desirable for attaining the objectives of this invention.

The surfactants used in the present invention are exemplified by the following:

Sorbitan and mannitan fatty acid esters:
    (1) Sorbitan monolaurate, sorbitan monomyristate, sorbitan monopalmitate, sorbitan monostearate, sorbitan monooleate and sorbitan monolinoleate.
    (2) Mannitan monolaurate, mannitan monomyristate, mannitan monopalmitate, mannitan monostearate, mannitan monooleate and mannitan monolinoleate.
Sucrose mono- or diesters of fatty acids:
    Sucrose mono- or dilaurate, sucrose mono- or dimyristate, sucrose mono- or dipalmitate, sucrose mono- or distearate and sucrose mono- or dioleate, or mixtures thereof.
Monoglycerides of higher fatty acids and their derivatives:
    Glycerol monolaurate, glycerol monomyristate, glycerol monopalmitate, glycerol monostearate, glycerol monooleate.
Condensation products of ethylene oxide with sorbitan or mannitan monofatty acid esters:
    Ethylene oxide condensates of sorbitan monolaurate, sorbitan monomyristate, sorbitan monopalmitate, sorbitan monostearate and sorbitan monoester of oleic acid.
Condensation products of ethylene oxide with long chain carboxylic acids:
    Polyoxyethylene laurate, palmitate, myristate, stearate and oleate, whose ethylene oxide chain is from 6 to 60 moles per mole of the acid.
Polyoxyethylene alkyl ethers:
    Polyoxyethylene dodecyl, tetradecyl, hexadecyl, octadecyl and oleyl ether.
Polyoxyethylene alkyl aryl ethers:
    Those containing 6 to 20 carbon atoms of alkyl and 6 to 30 moles of ethylene oxide per mole.
Polyethylene glycol fatty acid ethers:
    Those containing 6 to 20 carbon atoms of fatty acids and 12 to 120 carbon atoms of polyethylene glycol.
Propylene glycol fatty acid esters:
    Those containing 6 to 20 carbon atoms of fatty acids.
    Derivatives of glyceryl mono fatty acid esters.

The water to be used in the cooking step is a dilute aqueous solution of at least one of either a phosphate or polyphosphate, such as described previously in connection with the soaking step (a). The concentration of the phosphate component is preferably within the range from 0.05 to 0.5%.

In order to attain the objects of this invention, the first stage gelatinization is carried out in this cooking step. This step is carried out until the degree of gelatinization of 65–75%, and particularly ca. 70%, and the moisture content of 50–70% by weight (based on the absolute dry weight of the rice) are attained. This condition is usually attained by a treatment of not longer than about one hour.

The rice which has received the cooking-treatment (b) is next submitted to a steaming-treatment (c). This steaming step is carried out at a temperature 100–120° C. until a degree of gelatinization of substantially 100% is attained and the second stage gelatinization is finished. It is necessary in this case that along with the attainment of the aforesaid degree of gelatinization the treatment must be carried out such as to ensure a moisture content of 50–70%, and preferably 55–70%. The steaming can usually be accomplished in about 10–30 minutes.

The degree of gelatinization, as used herein, is determined in the following manner:

*Method of measuring the degree of gelatinization.*—About 30 ml. of distilled water are added to 50 grains of rice followed by subjecting it to the action of homogenizer for 10 minutes at 3000 r.p.m. The solution is then transferred quantitively to a 100-ml. measuring flask and filled up 100 ml. exactly. Two ml. of this solution is then placed in tappered test tubes; 10 ml. of 5% takadiastase aqueous solution is added so that enzymatic reaction is carried out for one hour in a 37° C. constant water bath. After completion of the reaction, 1.0 ml. of the reaction liquid is taken and its reducing sugar is quantitively analyzed by means of the modified Somogy method. Separately, as a first blank test, 10 ml. of pure water is added to 2.0 ml. of the suspension, instead of the takadiastase solution, and permitted to stand in a 37° C. constant water bath. One ml. of this mixture is quantitatively analyzed for its sugar by the modified Somogy method. As a second blank test, 10 ml. of the enzyme solution are added to 2.0 ml. of pure water and permitted to stand in a 37° C. constant water bath. One ml. of this mixture is also quantitatively analyzed. Now letting A, B, C and D represent the following values:

A=the quantitatively analyzed reducing sugar value when the rice starch has been completely gelatinized. In order to obtained complete gelatinization, the rice starch suspension which has been subjected to the action of the homogenizer is boiled for 30 minutes and again subjected to the action of the homogenizer;

B=the quantitatively analyzed sugar value in the enzymatic reaction solution of the specimen;

C=the quantitatively analyzed sugar value in the case of the second blank test, i.e., in the 5% takadiastase solution;

D=the quantitatively analyzed sugar value in the case of the first blank test, i.e., in the rice;

then the degree of gelatinization is expressed by the following equation:

$$\text{Degree of gelatinization (percent)} = \frac{(B-D)-C}{(A-D)-C} \times 100$$

Without losing the reconstitutive characteristics of rice by an excessive destruction of the starch micelles, the object for attaining full swelled and gelatinized rice is achieved by carrying out a two-stage gelatinization process which satisfies the degree of gelatinization and moisture contents as stated steps (b) and (c) under conditions that satisfy the soaking conditions of step (a) and connected with the presence of the additives in step (b). The direct blowing of steam in the cooking step (b) should be avoided as it would become difficult to adjust the moisture content to within the hereinabove specified range, through the degree of gelatinization could be adjusted.

The rice after the completion of steaming step (c), which has a moisture content of 50–70%, preferably 55–70%, and which has a degree of gelatinization of substantially 100%, is submitted to a quick-drying step (d). At this time, the drying must be rapidly carried out until a moisture content of less than 10% (based on the absolute dry weight), and preferably of the order of 5%, is attained. This step can be carried out by means of hot air, an electronic range, a foam mat, reduced pressure and infrared drying procedures or any of the other known drying means, but it is usually possible to accomplish the drying of the rice rapidly to a moisture content of less than 10% in about 20–30 minutes by means of hot air.

Next, the relationship between the reconstitution character of the gelatinized dry rice and the moisture content of the rice at the time after having received the treatments of steps (a), (b) and (c) and prior to its submission to the quick-drying step (d) will be illustrated.

In table I, below, the moisture content prior to drying, the degree of gelatinization, the moisture content after reconstitution (30 minutes in 20° C. water) and the palatability of the rice after reconstitution with hot water (5 minutes in 95° C. hot water) are shown comparatively for the gelatinized rice (F) of the present invention for the steam treatmented rice (A and B), for the water cooking treatmented rice (C), for the steam treatmented rice without additives (D), and for (E) where the step (a) was carried out following this invention but with a pure water steam treatment.

For the reconstitution measurement, the gelatinized dry rice was soaked under each temperature for each indicated periods as aforementioned.

As is apparent from the results of samples A and B, if the rise is treated only by steam, it is difficult to attain a moisture content of 50–70%, and preferably 55–70% by weight, just after step (c) and just prior to its submitted step (d). Even the degree of gelatinization of 96%, is attained its reconstitution speed is exceedingly low (see curves A and B), and moreover the reconstituted gelatinized rice is not palatable.

Samples C, D and E are so treated that the aforesaid moisture content becomes 55% as required by this invention, but they lack a part of the requisites in steps (a) and (b). The reconstitution speed of these samples show a marked improvement over that of samples A and B, but there is no substantial improvement in their palatableness and in their appearances. Further, as is apparent when the degree of gelatinization and reconstitutiveness of samples B and C are compared, the latter satisfies the prior-to-drying moisture content of this invention, but its degree of gelatinization is far inferior to that of sample B. Its reconstitution speed however exhibits a great improvement over that of sample B. On the other hand, in the case of samples D and E which satisfy both the prior-to-drying moisture content and degree of gelatinization requirements, there is an improvement in the palatableness over that of sample C, though not entirely satisfactory. However, compared with the invention product F, sample D and E cannot be regarded as being fully satisfactory in respect of its palatableness as well as reconstituted moisture content.

Further, when the numerous treatment conditions of the several processing steps and the combination steps were investigated more fully, it was found that the speed of reconstitution and the palatableness after reconstitution tended to be controlled principally by the moisture content prior to drying and the degree of gelatinization. We also found that when both of these two factors were enhanced, there was manifested an undesirable tendency that the appearance of the product would be suffered and agglomeration would tend to occur; hence, for improving collectively the reconstitution character, its palatableness and appearance after reconstitution, it was necessary to find the condition wherein the foregoing contradictory tendencies are not caused to act in such a manner as to offset each other.

Finally, we found that this could be achieved only upon satisfying all of the conditions involved in the several processing steps (a)–(d) of the present invention.

It appears that, among the various additives, the phosphates and polyphosphates which are used in the soaking and cooking steps softens the tissue proteins and hence are effective in facilitating the reconstitution and in obtaining a soft reconstituted rice in a short period. The

TABLE I

| Class | Sample | Treatment conditions | Moisture content (before drying), percent | Degree of gelatinization, percent | Moisture content (30 min. after reconstitution), percent | Palatableness (5 min. after reconstitution) |
|---|---|---|---|---|---|---|
| I | A | Steamed (100° C.) | 25 | 37 | 60–70 | Tough. |
|   | B | Steamed (130° C.) | 35 | 96 | 60–70 | Do. |
| II | C | Water cooked | 55 | 72 | 105–115 | Slightly tough. |
|   | D | Water cooked-steamed (without additives) | 55 | 100 | 105–115 | Very slightly tough. |
|   | E | Water cooked-steamed (additives only during soaking) | 55 | 100 | 105–115 | Do. |
| III | F | Water cooked-steamed (according to present invention) | 55 | 100 | 50 | Proper. |

For each samples A, B . . . F in Table I, the relationship between the reconstitution time in minutes and the reconstituted moisture content in 20° C. is shown in FIG. 1. In the figure, the curves A, B . . . F are respectively referred to sample A, B . . . F.

addition of the saccharide during the cooking step is presumed to serve in preventing the excessive swelling and disintegration of the starch particles during the gelatinization process and to impart a luster to the surface of the grains as well as a suitable stickiness upon reconstitution of the rice. On the other hand, the addition of the surfactant is believed to suitably prevent the tendency to excessive stickiness and agglomeration of the grains upon cooking and thus facilitate the steaming step. If the addition of one of these classes of additives is omitted or the processing step to which they are to be added is changed, the result will be a loss of the desirable improvements relative to the reconstitution character as well as the palatableness and appearance of the reconstituted gelatinized rice. Therefore the hereinbefore specified various conditions are important in that they are indispensable and inseparable requisites of this invention.

The following is an example illustrating the mode of practicing the method of the present invention:

EXAMPLE

Milled rice washed with water was soaked for one hour at 30° C. in an aqueous disodium phosphate solution of pH 7.6, after which it was immediately removed from the solution. To 190 grams of this soaked rice (150 grams before soaking) were added 10 grams of lactose and 0.5 gram of glycerol monostearate, after which it was cooked for 15 minutes in usual method using 0.3% aqueous disodium phosphate solution (one part by weight of rice to 0.75–1 part by weight of water; one part in this example) until a degree of gelatinization of 70% and a moisture content of 55% by weight were attained.

The rice which had been allowed to stand for a suitable period (about 20 minutes) after cooking was then steamed for 20 minutes at 100° C. to obtain a steamed product whose degree of gelatinization was 100% and moisture content was 60% by weight. This steamed product was immediately placed standing still in a hot air dryer to a moisture content of 8% in 30 minutes. The dried rice obtained in this manner, when reconstituted with hot water, was satisfactorily reconstituted in 5 minutes. It was fully soft to the centers of the grains and presented a good appearance. Further, there was not observed any agglomeration of the grains.

We claim:
1. A method of preparing a precooked dry rice which comprises, in combination, the steps of:
    (a) soaking milled rice in an aqueous solution of at least one member selected from the group consisting of phosphates and polyphosphates wherein the pH of the solution is between 7.3–8.5;
    (b) cooking said soaking-treatment-completed rice in a dilute aqueous solution of at least one member selected from the group consisting of phosphates and polyphosphates wherein the concentration of the phosphate component in the solution is between 0.05–0.5%, in the copresence of a saccharide and a surfactant, said cooking being effected until a degree of gelatinization of 65–75% and a moisture content of 50–70% by weight are attained;
    (c) steaming said cooking-treatment-completed rice at a temperature of 100–120° C. until a degree of gelatinization of 100% and a moisture content of 50–70% are attained; and thereafter
    (d) drying said rice rapidly until its moisture content becomes less than 10% by weight.

2. The method according to claim 1 wherein the rice treated by said aqueous solution in step (a) is thereafter isolated from said aqueous solution.

3. The method according to claim 1 wherein said saccharide and said surfactant are present in amounts ranging from 0.3–10% and 0.1–0.5%, respectively, based on the absolute dry weight of the material rice.

4. The method according to claim 3 wherein said saccharide is selected from the group consisting of lactose, sucrose, sorbitol, mannitol and partially hydrolyzed starch and said surfactant is selected from the group consisting of glycerol fatty acid esters, sucrose esters, sorbitan fatty acid esters and fatty acid propylene glycol esters.

5. The method according to claim 1 wherein said phosphates and polyphosphates used in steps (a) and (b) are selected from the group consisting of sodium, potassium, ammonium and lithium orthophosphates; sodium, potassium, ammonium and lithium pyrophosphates; sodium, potassium, ammonium and lithium acidic pyrophosphates; sodium, potassium, ammonium and lithium tripolyphosphates; sodium, potassium, ammonium and lithium tetrapolyphosphates; sodium, potassium, ammonium and lithium pentapolyphosphates; sodium, potassium, ammonium and lithium hexapolyphosphates; sodium, potassium, ammonium and lithium metaphosphates; and sodium, potassium, ammonium and lithium hexametaphosphates.

References Cited

UNITED STATES PATENTS

| | | | |
|---|---|---|---|
| 2,713,354 | 7/1955 | D'Atri | 99—80 |
| 2,720,460 | 10/1955 | Flynn et al. | 99—80 |
| 2,890,957 | 6/1959 | Seltzer | 99—80 |

RAYMOND N. JONES, Primary Examiner

J. R. HOFFMAN, Assistant Examiner